United States Patent
Kim et al.

(10) Patent No.: US 11,870,036 B2
(45) Date of Patent: Jan. 9, 2024

(54) LITHIUM SECONDARY BATTERY HAVING IMPROVED HIGH-TEMPERATURE CHARACTERISTICS

(71) Applicant: LG Chem, Ltd., Seoul (KR)

(72) Inventors: Gwang Yeon Kim, Daejeon (KR); Chul Haeng Lee, Daejeon (KR); Kyoung Ho Ahn, Daejeon (KR); Jeong Woo Oh, Daejeon (KR)

(73) Assignee: LG Energy Solution, Ltd.

( * ) Notice: Subject to any disclaimer, the term of this patent is extended or adjusted under 35 U.S.C. 154(b) by 343 days.

(21) Appl. No.: 16/766,976

(22) PCT Filed: Jul. 2, 2019

(86) PCT No.: PCT/KR2019/008065
§ 371 (c)(1),
(2) Date: May 26, 2020

(87) PCT Pub. No.: WO2020/009436
PCT Pub. Date: Jan. 9, 2020

(65) Prior Publication Data
US 2021/0036365 A1  Feb. 4, 2021

(30) Foreign Application Priority Data
Jul. 2, 2018  (KR) ........................ 10-2018-0076682

(51) Int. Cl.
| | |
|---|---|
| *H01M 10/0567* | (2010.01) |
| *H01M 4/131* | (2010.01) |
| *H01M 4/134* | (2010.01) |
| *H01M 4/505* | (2010.01) |
| *H01M 4/525* | (2010.01) |
| *H01M 10/0525* | (2010.01) |
| *H01M 10/0569* | (2010.01) |
| *H01M 4/02* | (2006.01) |

(52) U.S. Cl.
CPC ....... *H01M 10/0567* (2013.01); *H01M 4/131* (2013.01); *H01M 4/134* (2013.01); *H01M 4/505* (2013.01); *H01M 4/525* (2013.01); *H01M 10/0525* (2013.01); *H01M 10/0569* (2013.01); *H01M 2004/027* (2013.01); *H01M 2004/028* (2013.01)

(58) Field of Classification Search
CPC .................................................. H01M 10/05
See application file for complete search history.

(56) References Cited

U.S. PATENT DOCUMENTS

| | | |
|---|---|---|
| 2004/0234864 A1 | 11/2004 | Kubota |
| 2010/0119956 A1 | 5/2010 | Tokuda et al. |
| 2013/0136998 A1 | 5/2013 | Hwang et al. |
| 2014/0079988 A1 | 3/2014 | Han |
| 2015/0249269 A1 | 9/2015 | Yoon et al. |
| 2016/0028114 A1 | 1/2016 | Pratt et al. |
| 2017/0229735 A1 | 8/2017 | Ahn et al. |
| 2017/0317384 A1 | 11/2017 | Oomuro et al. |
| 2018/0294523 A1 | 10/2018 | Sivanandan et al. |
| 2018/0342767 A1* | 11/2018 | Lee ................ H01M 10/058 |
| 2019/0020063 A1 | 1/2019 | Kim et al. |
| 2021/0367269 A1* | 11/2021 | Kono ................... H01G 11/06 |

FOREIGN PATENT DOCUMENTS

| | | | |
|---|---|---|---|
| CN | 1610173 A | 4/2005 | |
| CN | 103682438 A | 3/2014 | |
| EP | 3203564 A1 | 8/2017 | |
| JP | 2008127498 A | 6/2008 | |
| JP | 2008277000 A | 11/2008 | |
| JP | 2018037389 A | 3/2018 | |
| KR | 20150102916 A | 9/2015 | |
| KR | 20160030765 A | 3/2016 | |
| KR | 20160040127 A | 4/2016 | |
| KR | 20170068595 A | 6/2017 | |
| KR | 20180026358 A | 3/2018 | |
| KR | 20180032692 A | 3/2018 | |
| KR | 20180054499 A | 5/2018 | |
| KR | 20190054973 A | 5/2019 | |
| WO | WO-2016053065 A1 * | 4/2016 | ......... H01M 10/052 |
| WO | WO-2018003992 A1 * | 1/2018 | ....... H01M 10/0525 |
| WO | WO-2018044129 A1 * | 3/2018 | ............... C08J 5/22 |
| WO | 2018131952 A1 | 7/2018 | |
| WO | WO-2019187545 A1 * | 10/2019 | .......... C07D 333/48 |

OTHER PUBLICATIONS

Machine Translation of Ahn (Year: 2016).*
Machine Translation of Itabashi (Year: 2018).*
Wong et al., "Nonflammable perfluoropolyether-based electrolytes for lithium batteries," Proceedings of the National Academy of Sciences of the United States of America, Mar. 4, 2014, vol. 111, No. 9, pp. 3327-3331.
International Search Report for PCT/KR2019/008065 dated Oct. 11, 2019; 3 pages.
Extended European Search Report including Written Opinion dated Jan. 14, 2021 for Application No. 19829899.4, 6 pages.
Search Report dated Oct. 28, 22 from Office Action for Chinese Application No. 201980005815.X dated Nov. 2, 2022. 3 pgs.

* cited by examiner

*Primary Examiner* — Matthew T Martin
*Assistant Examiner* — Ankith R Sripathi
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution for a lithium secondary battery includes an organic solvent, $LiPF_6$ as a first lithium salt, a second lithium salt excluding the $LiPF_6$, an oligomer represented by Formula 1, as a first additive, and a mixed additive of lithium difluorophosphate (LiDFP), fluorobenzene (FB), and tetravinylsilane (TVS), as a second additive.

8 Claims, No Drawings

LITHIUM SECONDARY BATTERY HAVING IMPROVED HIGH-TEMPERATURE CHARACTERISTICS

CROSS-REFERENCE TO RELATED APPLICATIONS

The present application is a national phase entry under 35 U.S.C. § 371 of International Application No. PCT/KR2019/008065, filed on Jul. 2, 2019, which claims priority from Korean Patent Application No. 10-2018-0076682, filed on Jul. 2, 2018, the disclosures of which are incorporated by reference herein.

TECHNICAL FIELD

The present invention relates to a lithium secondary battery having improved high-temperature characteristics and low-temperature characteristics.

BACKGROUND ART

There is a need to develop technology for efficiently storing and utilizing electrical energy as personal IT devices and computer networks are developed with the development of information society and the accompanying dependency of society as a whole on the electrical energy is increased.

A technology based on secondary batteries is the most suitable technology for various applications, wherein, since a secondary battery may be miniaturized, it may be applied to a personal IT device and it may also be applied to a large device such as a power storage device.

Among these secondary battery technologies, lithium ion batteries, which are battery systems having the theoretically highest energy density, are in the spotlight.

The lithium ion battery is composed of four materials such as a positive electrode formed of a transition metal oxide containing lithium, a negative electrode capable of storing lithium, an electrolyte solution as a medium for transferring lithium ions, and a separator.

Recently, in line with an increase in demand for secondary batteries with high output and high capacity such as batteries for electric vehicles, research on the development of a high-capacity and high-output lithium secondary battery suitable for this purpose has emerged.

As one of methods of achieving the high-capacity and high-output lithium secondary battery, a method of increasing a concentration of lithium ions in a battery by using a non-aqueous electrolyte solution containing a high concentration lithium salt has been suggested.

However, in a case in which the concentration of the lithium salt in the non-aqueous electrolyte solution is increased, since life characteristics are not only degraded due to an increase in side reaction between an electrode active material and an electrolyte, but electrolyte wetting is also significantly reduced due to an excessive increase in viscosity of the non-aqueous electrolyte solution, durability at high temperature and low temperature may be reduced. This phenomenon is particularly severe when a driving voltage of the battery is a high voltage of 4.45 V or more.

Thus, in order to develop the high-capacity and high-output lithium secondary battery, there is a need to develop an electrolyte in which wetting is improved while a side reaction with an electrode is effectively controlled.

PRIOR ART DOCUMENT

Korean Patent Application Laid-open Publication No. 2016-0030765

DISCLOSURE OF THE INVENTION

Technical Problem

An aspect of the present invention provides a non-aqueous electrolyte solution for a lithium secondary battery including an additive which may form a stable film on a surface of an electrode and may simultaneously improve wetting by reducing interfacial resistance with the electrode.

Another aspect of the present invention provides a lithium secondary battery having improved high-temperature characteristics and low-temperature characteristics by including the non-aqueous electrolyte solution.

Technical Solution

According to an aspect of the present invention, there is provided a non-aqueous electrolyte solution for a lithium secondary battery which includes:
an organic solvent,
$LiPF_6$ as a first lithium salt,
a second lithium salt excluding the $LiPF_6$,
an oligomer represented by the following Formula 1, as a first additive, and
a mixed additive of lithium difluorophosphate (LiDFP), fluorobenzene (FB), and tetravinylsilane (TVS), as a second additive.

[Formula 1]

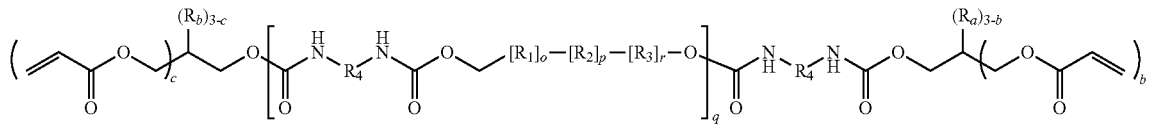

In Formula 1,
$R_1$ is an alkylene group having 1 to 5 carbon atoms which is unsubstituted or substituted with fluorine, or —$R_1'$—O—, wherein $R_1'$ is an alkylene group having 1 to 5 carbon atoms which is unsubstituted or substituted with fluorine,
$R_2$ is an alkylene group having 1 to 3 carbon atoms which is unsubstituted or substituted with fluorine, or —$R_2'$—O—, wherein $R_2'$ is an alkylene group having 1 to 3 carbon atoms which is unsubstituted or substituted with fluorine,
$R_3$ is an alkylene group having 1 to 5 carbon atoms which is unsubstituted or substituted with fluorine,
$R_4$ is an aliphatic hydrocarbon group or an aromatic hydrocarbon group,
$R_a$ and $R_b$ are each independently hydrogen or an alkyl group having 1 to 3 carbon atoms, o, p, q, and r are numbers of repeating units,
is an integer of 1 to 5,
p is an integer of 1 to 10,
r is an integer of 1 to 5,
q is an integer of 1 to 15, and
b and c are each independently an integer of 1 to 3.

A molar ratio of the first lithium salt to the second lithium salt may be in a range of 1:0.5 to 1:3.3.

The organic solvent in the non-aqueous electrolyte solution may be a mixed solvent including a cyclic carbonate-based organic solvent and a linear carbonate-based organic solvent, wherein the linear carbonate-based organic solvent may be dimethyl carbonate.

In the oligomer represented by Formula 1, $R_1$ may be $R_1'$—O—, wherein $R_1'$ is an alkylene group having 1 to 5 carbon atoms which is substituted with fluorine, $R_2$ may be $R_2'$—O—, wherein $R_2'$ is an alkylene group having 1 to 3 carbon atoms which is substituted with fluorine, and $R_3$ may be an alkylene group having 1 to 3 carbon atoms which is unsubstituted or substituted with fluorine.

Specifically, the oligomer represented by Formula 1 may be a compound represented by Formula 1a below.

effect of the movement of lithium ions is improved and wetting with respect to an electrode and a separator is improved, may be prepared by including two types of lithium salts and additives capable of reducing surface tension of the electrolyte solution as well as forming a stable film on a surface of the electrode. Also, a lithium secondary battery having improved low-temperature characteristics, high-temperature cycle characteristics, and high-temperature capacity characteristics may be prepared by including the non-aqueous electrolyte solution.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical

[Formula 1a]

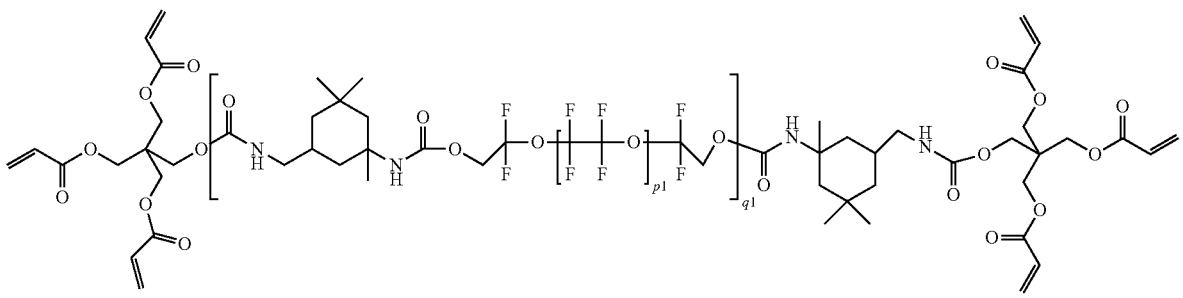

In Formula 1a,
p1 and q1 are numbers of repeating units,
p1 is an integer of 1 to 10, and
q1 is an integer of 1 to 5.

The first additive may be included in an amount of 0.1 wt % to 5.5 wt % based on a total weight of the non-aqueous electrolyte solution.

The second additive may include the lithium difluorophosphate (LiDFP), the fluorobenzene (FB), and the tetravinylsilane (TVS) in a weight ratio of 1:1:0.05 to 1:6:0.5.

According to another aspect of the present invention, there is provided a lithium secondary battery including the non-aqueous electrolyte solution of the present invention.

The lithium secondary battery may include a positive electrode including a lithium transition metal oxide represented by Formula 5 as a positive electrode active material, a negative electrode including graphite and SiO as a negative electrode active material, and a separator.

$Li_x(Ni_aCo_bMn_c)O_2$ [Formula 5]

In Formula 5, $0.9 \leq x \leq 1.2, 0.65 < a \leq 0.9, 0.05 \leq b < 0.35$, and $0.05 \leq c < 0.35$.

Advantageous Effects

According to the present invention, a non-aqueous electrolyte solution for a lithium secondary battery, in which an idea of the invention, based on the principle that an inventor may properly define the meaning of the words or terms to best explain the invention.

For example, in this specification, it will be further understood that the terms "include," "comprise," or "have" specify the presence of stated features, numbers, steps, elements, or combinations thereof, but do not preclude the presence or addition of one or more other features, numbers, steps, elements, or combinations thereof.

Also, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —CH$_2$—, —CH$_2$CH$_2$—, —CH$_2$CH$_2$CH$_2$—, —CH$_2$(CH$_2$)CH—, —CH$_2$CH$_2$CH$_2$CH$_2$CH$_2$—, and —CH(CH$_2$)CH$_2$CH$_2$—.

Furthermore, in this specification, the expression "alkylene group" denotes a branched or unbranched aliphatic hydrocarbon group or a functional group in the form in which one hydrogen atom is removed from a carbon atom located at both ends of the aliphatic hydrocarbon group. In an embodiment, the alkylene group may be substituted or unsubstituted. The alkylene group may include a methylene group, an ethylene group, a propylene group, an isopropylene group, a butylene group, an isobutylene group, a tert-butylene group, a pentylene group, and a 3-pentylene group, but the alkylene group is not limited thereto, and each of which may be optionally substituted in other embodiments.

Also, unless otherwise defined in the specification, the expression "substitution" denotes that at least one hydrogen bonded to carbon is substituted with an element other than hydrogen, for example, an alkyl group having 1 to 5 carbon atoms or a fluorine element.

As a result of significant amount of research conducted to prepare a lithium secondary battery having improved high-temperature storage characteristics and cycle life characteristics, the present inventors have found that, in a case in which a non-aqueous electrolyte solution containing two types of lithium salts and specific additives is included, an effect of the movement of lithium ions may be improved and wetting of the non-aqueous electrolyte solution to an electrode may be simultaneously improved to prepare a secondary battery capable of improving high-temperature storage characteristics and cycle life characteristics, thereby leading to the completion of the present invention.

Non-Aqueous Electrolyte Solution for Lithium Secondary Battery

Hereinafter, a non-aqueous electrolyte solution for a lithium secondary battery according to the present invention will be described in detail.

First, in order to achieve the object, according to an embodiment of the present invention, provided is a non-aqueous electrolyte solution for a lithium secondary battery which includes:

an organic solvent,
$LiPF_6$ as a first lithium salt,
a second lithium salt excluding the $LiPF_6$,
an oligomer represented by the following Formula 1, as a first additive, and
a mixed additive of lithium difluorophosphate (LiDFP), fluorobenzene (FB), and tetravinylsilane (TVS), as a second additive.

(1) Lithium Salt

The non-aqueous electrolyte solution of the present invention may include two types of lithium salts, for example, $LiPF_6$ as a first lithium salt, and a second lithium salt excluding the $LiPF_6$.

The second lithium salt is other than $LiPF_6$, wherein, for example, the second lithium salt may include $Li^+$ as a cation, and may include at least one anion selected from the group consisting of $Cl^-$, $Br^-$, $I^-$, $BF_4^-$, $NO_3^-$, $N(CN)_2^-$, $ClO_4^-$, $AlO_4^-$, $AlCl_4^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$. Specifically, the second lithium salt may include at least one selected from the group consisting of LiCl, LiBr, LiI, $LiBF_4$, $LiClO_4$, $LiAlO_4$, $LiAlCl_4$, $LiSbF_6$, $LiAsF_6$, $LiB_{10}Cl_{10}$, $LiCF_3SO_3$, $LiN(SO_2CF_3)_2$, $LiN(SO_2F)_2$ (LiFSI), $LiCH_3SO_3$, $LiCF_3CO_2$, $LiCH_3CO_2$, and $LiN(SO_2CF_2CF_3)_2$, and the lithium salt may more specifically include $LiN(SO_2F)_2$.

A molar ratio of the first lithium salt to the second lithium salt may be in a range of 1:0.5 to 1:3.3, for example, 1:1.3 to 1:3.

In a case in which the molar ratio of the second lithium salt to the first lithium salt is less than 0.5, since the molar ratio of the second lithium salt to the first lithium salt is relatively low, ionic conductivity of an electrolyte may be decreased and an improvement range of interfacial resistance may be reduced to increase internal resistance at low temperature. If the molar ratio of the second lithium salt to the first lithium salt is greater than 3.3, oxidation stability at a high voltage may be reduced.

[Formula 1]

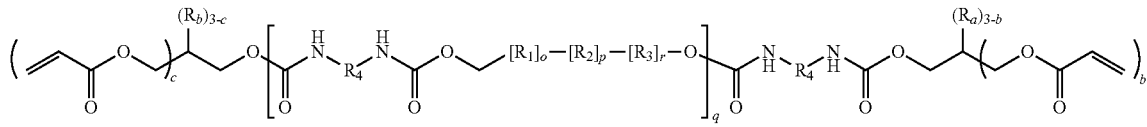

In Formula 1, $R_1$ is an alkylene group having 1 to 5 carbon atoms which is unsubstituted or substituted with fluorine, or —$R_1'$—O—, wherein $R_1'$ is an alkylene group having 1 to 5 carbon atoms which is unsubstituted or substituted with fluorine, $R_2$ is an alkylene group having 1 to 3 carbon atoms which is unsubstituted or substituted with fluorine, or —$R_2'$—O—, wherein $R_2'$ is an alkylene group having 1 to 3 carbon atoms which is unsubstituted or substituted with fluorine, $R_3$ is an alkylene group having 1 to 5 carbon atoms which is unsubstituted or substituted with fluorine, $R_4$ is an aliphatic hydrocarbon group or an aromatic hydrocarbon group, $R_a$ and $R_b$ are each independently hydrogen or an alkyl group having 1 to 3 carbon atoms, o, p, q, and r are numbers of repeating units, is an integer of 1 to 5, p is an integer of 1 to 10, r is an integer of 1 to 5, q is an integer of 1 to 15, and b and c are each independently an integer of 1 to 3.

A mixed concentration of the first lithium salt and the second lithium salt may be in a range of 1.3 M to 3 M, particularly 1.5 M to 2.5 M, and more particularly 1.5 M to 2 M.

As described above, since the non-aqueous electrolyte solution of the present invention includes the two types of the lithium salts, the non-aqueous electrolyte solution of the present invention may increase movement density of lithium ions in the battery, may stabilize $LiPF_6$ as the first lithium salt, and, furthermore, may form a more stable film on a surface of the electrode by a lithium salt anion derivative. In a case in which the mixed concentration of the lithium salts is less than 1.3 M, capacity characteristics may be reduced during high-temperature storage, and, in a case in which the mixed concentration of the lithium salts is greater than 3 M, viscosity of the non-aqueous electrolyte solution may be excessively increased to significantly reduce electrolyte solution wetting.

(2) Organic Solvent

In the non-aqueous electrolyte solution of the present invention, the organic solvent may minimize decomposition due to an oxidation reaction during charge and discharge of the secondary battery and may exhibit desired characteristics with an additive, wherein a carbonate-based organic solvent or an ester-based organic solvent may be used.

The carbonate-based organic solvent may be at least one of a cyclic carbonate-based organic solvent and a linear carbonate-based organic solvent.

Also, the ester-based organic solvent may be at least one of a linear ester-based organic solvent a cyclic ester-based organic solvent.

The cyclic carbonate-based organic solvent may specifically include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and, among them, the cyclic carbonate-based organic solvent may include ethylene carbonate capable of stably maintaining passivation ability of a solid electrolyte interface (SEI).

The linear carbonate-based organic solvent may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and, among them, the linear carbonate-based organic solvent may include dimethyl carbonate (DMC) having low viscosity characteristics while having a small molecular size.

The linear ester-based organic solvent may include at least one organic solvent selected from the group consisting of methyl acetate, ethyl acetate, propyl acetate, methyl propionate, ethyl propionate, propyl propionate, and butyl propionate.

Specific examples of the cyclic ester-based organic solvent may be at least one organic solvent selected from the group consisting of γ-butyrolactone, γ-valerolactone, γ-caprolactone, σ-valerolactone, and ε-caprolactone.

The organic solvent included in the non-aqueous electrolyte solution of the present invention may more preferably be a mixture of the cyclic carbonate-based organic solvent having high ionic conductivity and high dielectric constant, which may increase charge/discharge performance of the battery, and the linear carbonate-based organic solvent having low-viscosity and low dielectric constant.

Specifically, the non-aqueous electrolyte solution of the present invention may include the cyclic carbonate-based organic solvent and the linear carbonate-based organic solvent to minimize an increase in the viscosity of the non-aqueous electrolyte solution due to the two types of the lithium salts, wherein a non-aqueous electrolyte solution having high electrical conductivity may be prepared by mixing the cyclic carbonate-based organic solvent and the linear carbonate-based organic solvent in a volume ratio of about 1:4 to about 1:12, particularly 1:6 to 1:10, and more particularly 1:8 to 1:10, for example, 1:9.

That is, in a case in which the volume ratio of the linear carbonate-based organic solvent to the cyclic carbonate-based organic solvent is 4 or more, the passivation ability of the stable SEI may be maintained, and, in a case in which the volume ratio of the linear carbonate-based organic solvent to the cyclic carbonate-based organic solvent is 12 or less, since electrolyte wetting is improved by preventing an increase in viscosity of the electrolyte, stability at high voltage may be increased.

An ether-based organic solvent or a nitrile-based organic solvent may be further mixed and used as the organic solvent, if necessary, in addition to the carbonate-based organic solvent and the ester-based organic solvent.

Any one selected from the group consisting of dimethyl ether, diethyl ether, dipropyl ether, methylethyl ether, methylpropyl ether, and ethylpropyl ether or a mixture of two or more thereof may be used as the ether-based organic solvent.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(3) First Additive

Also, the non-aqueous electrolyte solution may include the oligomer represented by Formula 1, as a first additive which may improve wetting by reducing surface tension of the non-aqueous electrolyte solution.

In this case, in the oligomer represented by Formula 1, $R_1$ may be $R_1'$—O—, wherein $R_1'$ is an alkylene group having 1 to 5 carbon atoms which is substituted with fluorine, $R_2$ may be $R_2'$—O—, wherein $R_2'$ is an alkylene group having 1 to 3 carbon atoms which is substituted with fluorine, and $R_3$ may be an alkylene group having 1 to 3 carbon atoms which is unsubstituted or substituted with fluorine.

In the oligomer represented by Formula 1, the aliphatic hydrocarbon group of $R_4$ may include an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in the oligomer represented by Formula 1, the aromatic hydrocarbon group of $R_4$ may include a substituted or unsubstituted arylene group having 6 to 20 carbon atoms; or a substituted or unsubstituted heteroarylene group having 2 to 20 carbon atoms.

Specifically, the oligomer represented by Formula 1, as the first additive, may be a compound represented by Formula 1a below.

[Formula 1a]

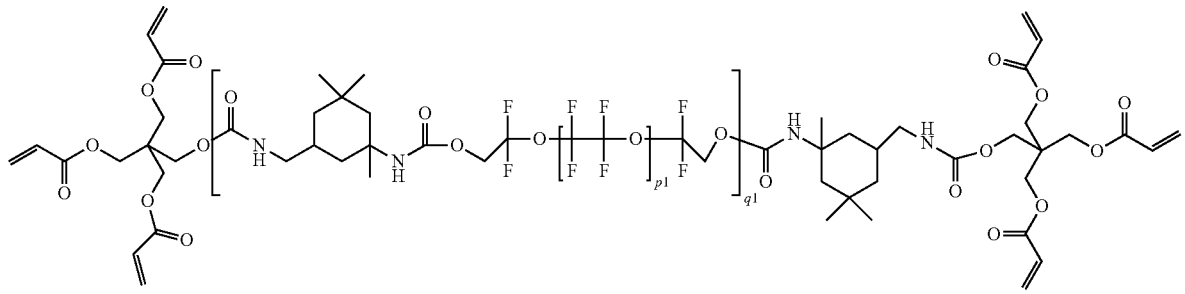

In Formula 1a,
p1 and q1 are numbers of repeating units,
p1 is an integer of 1 to 10, and
q1 is an integer of 1 to 5.

The first additive may be included in an amount of 0.1 wt % to 5.5 wt %, particularly 0.1 wt % to 5 wt %, and more particularly 0.5 wt % to 3 wt % based on a total weight of the non-aqueous electrolyte solution.

Since the first additive is included at the above concentration in the non-aqueous electrolyte solution, the wetting may be improved by reducing the surface tension of the non-aqueous electrolyte solution. If the amount of the first additive is less than 0.1 wt %, an effect of improving the electrolyte solution wetting may be insignificant, and, if the amount of the first additive is greater than 5.5 wt %, an increase in resistance and a side reaction at high temperature may occur due to the excessive amount of the additive to cause a reduction in capacity. Particularly, since the movement of lithium ions is restricted by the increase in the viscosity of the electrolyte solution, the ionic conductivity may be reduced.

A weight-average molecular weight (Mw) of the oligomer represented by Formula 1 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol. If the weight-average molecular weight of the oligomer represented by Formula 1 is within the above range, since affinity with the organic solvent is high, a uniform electrolyte solution may be prepared.

If the weight-average molecular weight of the oligomer represented by Formula 1 is less than 1,000 g/mol, a role of surfactant improving the surface tension of the electrolyte solution may be insignificant, and, if the weight-average molecular weight of the oligomer is greater than 100,000 g/mol, since physical properties of the oligomer itself become rigid and the affinity with the organic solvent is decreased, dissolution is difficult, and thus, an effect of improving the wetting of the non-aqueous electrolyte solution may not be expected.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Since the oligomer represented by Formula 1 contains a urethane group (—N—C(O)O—) and at least one fluorine-substituted ether group, as a hydrophobic part, in its main chain as well as an acrylate functional group as a hydrophilic group capable of forming a crosslink at both ends of the main chain by itself, the oligomer represented by Formula 1 may exhibit a balanced affinity for a positive electrode or separator (SRS layer), as a hydrophilic part, and a negative electrode or separator fabric, as a hydrophobic part, to act as a surfactant.

Furthermore, since the oligomer represented by Formula 1 not only has high reduction stability but also possesses the ability to dissociate the lithium salt by including a fluorine-substituted polyether group in its main chain, the oligomer represented by Formula 1 may minimize a reduction reaction on a surface of the negative electrode and, simultaneously, may further improve lithium ion mobility due to an increase in degree of freedom of lithium (Li) ions by anion stabilization, and thus, an effect of reducing the interfacial resistance may be achieved.

Thus, with respect to the non-aqueous electrolyte solution of the present invention which includes the oligomer represented by Formula 1, as the first additive, as well as the two types of the lithium salts, the effect of improving the wetting of the electrolyte solution to the electrode and the separator may be achieved by suppressing the interfacial resistance between the electrode and the separator while reducing the surface tension of the non-aqueous electrolyte solution. Furthermore, a lithium secondary battery having improved storage characteristics, life characteristics, and capacity characteristics after high-temperature storage may be prepared by improving limitations due to lithium precipitation and a side reaction of the battery which are caused by a reduction in the electrolyte solution wetting of the lithium secondary battery including the non-aqueous electrolyte solution.

(4) Second Additive

In the present invention, a mixed additive of lithium difluorophosphate (LiDFP), fluorobenzene (FB), and tetravinylsilane (TVS) may be included as a second additive in addition to the first additive.

lithium difluorophosphate (LiDFP) represented by the following Formula 2, as one of components of the second additive, is a component for achieving an effect of improving long-term life characteristics of the secondary battery, wherein a lithium ion component, which is formed by decomposition during initial charge, is electrochemically decomposed on the surface of the negative electrode to form a stable SEI. Due to the formation of the SEI, Li mobility to the negative electrode may not only be improved, but the interfacial resistance may also be reduced. Also, difluorophosphate anions formed by decomposition during initial charge may improve positive electrode stabilization and discharge characteristics while being present on a surface of the positive electrode. Thus, the effect of improving long-term life characteristics of the secondary battery may be achieved.

[Formula 2]

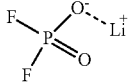

Also, fluorobenzene represented by the following Formula 3, which is included as one of the second additive components, is a component for improving stability during overcharge, wherein, when the fluorobenzene is included, since a product decomposed at a specific potential forms a polymer layer to suppress ignition during overcharge, an effect of improving stability may be obtained.

[Formula 3]

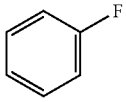

Furthermore, tetravinylsilane represented by the following Formula 4, which is included as one of the second additive components, is a component capable of suppressing a reaction between lithium ions and the electrolyte solution, wherein, since a silicon (Si) element contained therein may form a robust ion conductive film on the surfaces of the positive electrode and the negative electrode through physical adsorption and electrochemical reaction, the tetravinylsilane may improve stability during high-temperature storage by suppressing a side reaction between the electrolyte solution and a positive electrode material at high voltage.

[Formula 4]

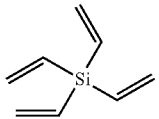

A weight ratio of the lithium difluorophosphate (LiDFP), the fluorobenzene (FB), and the tetravinylsilane (TVS), as the second additive, may be in a range of 1:1:0.05 to 1:6:0.5, for example, 1:1:0.05 to 1:6:0.3.

In a case in which the components constituting the second additive in the non-aqueous electrolyte solution of the present invention are mixed in the above ratio, since a high-quality stable SEI with low resistance in the electrolyte solution may be formed, the side reaction between the electrolyte solution and the electrode may not only be suppressed during high-temperature storage or charging, but gas generation and an increase in electrode interfacial resistance at high temperature may also be reduced. Particularly, with respect to the lithium difluorophosphate (LiDFP), the lithium ion component, which is formed by decomposition during initial charge, may form a stable SEI on the surface of the negative electrode, and, due to the formation of the SEI, the Li mobility to the negative electrode may not only be improved, but the interfacial resistance may also be reduced. Also, the difluorophosphate anions formed by decomposition during initial charge may improve positive electrode stabilization and discharge characteristics while being present on the surface of the positive electrode. Since the tetravinylsilane contains the Si element, the Si element forms a stable film on the surface of the positive electrode, and thus, the side reaction of the positive electrode material at high voltage may be suppressed to improve high-temperature durability and electrochemical stability.

That is, if the weight ratio of the fluorobenzene to the lithium difluorophosphate is 6 or less, an increase in internal resistance of the battery due to the excessive use of the additive may be prevented. Also, if the weight ratio of the fluorobenzene is 1 or more, a stability improvement effect may be obtained during overcharge. However, in a case in which the weight ratio of the fluorobenzene to the lithium difluorophosphate is greater than the above range, since the surplus fluorobenzene causes a side reaction to increase the resistance of the battery, cycle life characteristics may be degraded. In contrast, in a case in which the weight ratio of the fluorobenzene is less than the above range, a gas generation reducing effect and an effect of forming an SEI are insignificant.

Also, if the weight ratio of the tetravinylsilane to the lithium difluorophosphate is 0.5 or less, since the increase in the resistance of the battery due to a side reaction caused by the surplus tetravinylsilane may be prevented, a reduction in the cycle life characteristics may be prevented. Furthermore, if the weight ratio of the tetravinylsilane is 0.05 or more, a gas generation reducing effect and a stabilizing effect during the formation of the SEI may be obtained. If the weight ratio of the tetravinylsilane is less than 0.05, the high-temperature durability may be reduced, and if the weight ratio of the tetravinylsilane is greater than 0.5, initial resistance may be increased to degrade low-temperature characteristics.

A total amount of the second additive may be in a range of 8 wt % or less, particularly 0.1 wt % to 8 wt %, particularly 0.5 wt % to 8 wt %, and particularly 2 wt % to 7.5 wt % based on the total weight of the non-aqueous electrolyte solution for a lithium secondary battery.

If the amount of the second additive is 0.1 wt % or more, expected effects resulting from the addition of each component may be met, for example, an effect of forming a stable film (SEI) on the surface of the negative electrode may not only be improved, but the decomposition of the electrolyte solution caused by the reaction between the electrolyte solution and the negative electrode may also be suppressed to achieve the gas generation reducing effect. Also, in a case in which the amount of the second additive is 8 wt % or less, the gas generation reducing effect according to the use of the additive may not only be improved, but also the increase in the resistance due to the side reaction may be prevented and a stable SEI may be formed on the surface of the electrode by preventing each component from excessively remaining, and thus, an effect of improving high-temperature storage characteristics of the lithium secondary battery may be obtained. If the amount of the additive is greater than 8 wt %, the gas generation reducing effect may be improved by the use of excessive amount of the additive, but, since an excessively thick film is formed on the surface of the electrode while the excessive amount of each component remains, resistance may increase and output may degrade.

Also, in the non-aqueous electrolyte solution of the present invention, a weight ratio of the first additive:the second additive may be in a range of 1:1 to 1:15, for example, 1:4 to 1:14.4.

In a case in which the first additive and the second additive are mixed in the above ratio, the wetting of the electrolyte solution may be improved by reducing the surface tension. Also, the side reaction between the electrolyte solution and the electrode during charge at high temperature may be suppressed by forming a stable SEI without the increase in resistance.

In a case in which the weight ratio of the second additive to the first additive is greater than 15, since initial interfacial resistance is increased while an excessively thick film is formed on the surface of the electrode, output may be reduced. Also, in a case in which the weight ratio of the second additive to the first additive is less than 1, since the effect of forming an SEI is insignificant, an effect of suppressing the side reaction between the electrolyte solution and the electrode may be reduced.

(5) Additional Additive

In order to further achieve effects of improving high-temperature storage characteristics, cycle life characteristics, low-temperature high rate discharge characteristics, overcharge prevention, and high-temperature swelling, the non-aqueous electrolyte solution according to the embodiment of the present invention may further include additional additives, if necessary.

The additional additive is not particularly limited as long as it is an additive that may form a stable film on the surfaces of the positive electrode and the negative electrode while not significantly increasing initial resistance.

The additional additive may include a conventionally known electrolyte solution additive, specifically, at least one selected from the group consisting of vinylene carbonate (VC), $LiBF_4$, vinyl ethylene carbonate, 1,3-propane sultone (PS), 1,3-propene sultone (PRS), succinonitrile (SN), adiponitrile (Adn), fluoroethylene carbonate (FEC), ethylene sulfate (Esa), methyl trimethylene sulfate (MTMS), tetraphenylborate (TPB), tetramethyltrimethylsilyl phosphate (TMSPa), trimethylsilyl phosphite (TMSPi), tris(2,2,2-trifluoroethyl)phosphate (TFEPa), and tris(trifluoroethyl)phosphite (TFEPi).

Among these additional additives, it is known that particularly vinylene carbonate, $LiBF_4$, 1,3-propane sultone (PS), and ethylene sulfate (Esa) may form a more stable SEI on the surface of the negative electrode together with lithium difluorophosphate during an initial activation process of the secondary battery.

The additional additive may be included in an amount of 10 wt % or less, for example, 0.5 wt % to 7 wt % based on the total weight of the non-aqueous electrolyte solution.

If the amount of the additional additive is greater than 10 wt %, there is possibility that the side reaction in the electrolyte solution may not only occur excessively during charge and discharge due to the excessive amount of the additive used, but also, since the additional additive may not be sufficiently decomposed at high temperature, the additional additive may be present in the form of an unreacted material or precipitates in the electrolyte solution at room temperature, and, accordingly, life or resistance characteristics of the secondary battery may be degraded.

Lithium Secondary Battery

Hereinafter, a lithium secondary battery according to the present invention will be described in more detail.

According to an embodiment of the present invention, provided is a lithium secondary battery including: a positive electrode including a positive electrode active material, a negative electrode including a negative electrode active material, a separator, and a non-aqueous electrolyte solution, wherein the positive electrode active material includes a lithium transition metal oxide represented by the following Formula 5, and the non-aqueous electrolyte solution is the non-aqueous electrolyte solution for a lithium secondary battery of the present invention.

$$Li_x(Ni_aCo_bMn_c)O_2 \quad \text{[Formula 5]}$$

In Formula 5, $0.9 \leq x \leq 1.2, 0.65 < a \leq 0.9, 0.05 \leq b < 0.35,$ and $0.05 \leq c < 0.35$.

(1) Positive Electrode

First, in the lithium secondary battery according to the embodiment of the present invention, the positive electrode may be prepared by a conventional method and used.

That is, the positive electrode includes a positive electrode collector and a positive electrode material mixture layer formed on the positive electrode collector, and, in this case, the positive electrode material mixture layer may be prepared by coating the positive electrode collector with a positive electrode slurry including a positive electrode active material as well as selectively a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material may include the lithium-nickel-manganese-cobalt-based oxide represented by Formula 5 which is capable of reversibly intercalating and deintercalating lithium, wherein typical examples of the lithium-nickel-manganese-cobalt-based oxide may be $Li(Ni_{0.7}Mn_{0.15}Co_{0.15})O_2$ or $Li(Ni_{0.8}Mn_{0.1}Co_{0.1})O_2$ in terms of the improvement of capacity characteristics and stability of the battery.

The lithium-nickel-manganese-cobalt-based oxide is disadvantageous in that high-temperature storage characteristics and capacity characteristics are degraded due to the side reaction with the electrolyte solution at high temperature.

Thus, in the present invention, since the positive electrode is used together with the non-aqueous electrolyte solution including the two types of the lithium salts and the two types of the additives, the decomposition of the solvent at high temperature and the resulting side reaction may be prevented by reducing an amount of free solvent due to coordination bonds between the organic solvent and $Li^+$. Thus, performance degradation of the secondary battery at high temperature and low temperature may be improved.

In addition to the lithium transition metal oxide represented by Formula 5, the positive electrode active material may further include at least one selected from the group consisting of lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and p1+q1+r2=2), etc.), and lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and may specifically be $LiCoO_2$, $LiMnO_2$, $LiNiO_2$, $Li(Ni_{1/3}Mn_{1/3}Co_{1/3})O_2$, $Li(Ni_{0.6}Mn_{0.2}Co_{0.2})O_2$, or $Li(Ni_{0.5}Mn_{0.3}Co_{0.2})O_2$.

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is decreased, capacity may be reduced.

Also, the binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion may be improved, but the amount of the positive electrode active material is reduced to such an extent that battery capacity may be reduced.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer, a sulfonated ethylene-propylene-diene terpolymer, a styrene-butadiene rubber, a fluoro rubber, various copolymers, and the like.

Furthermore, the conductive agent may be added in an amount of 1 wt % to 20 wt % based on the total weight of the solid content in the positive electrode slurry. When the amount of the conductive agent is excessively small at less than 1 wt %, it is difficult to expect an effect of improving electrical conductivity or electrochemical properties of the battery may be degraded, and, when the amount of the conductive agent is excessively large at greater than 20 wt %, the amount of the positive electrode active material is relatively reduced so that capacity and energy density may be reduced.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the positive electrode slurry including the positive electrode active material as well as selectively the binder and the conductive agent is in a range of 10 wt % to 60 wt %, for example, 20 wt % to 60 wt %.

(2) Negative Electrode

In the lithium secondary battery according to the embodiment of the present invention, the negative electrode may be prepared by a conventional method and used.

Specifically, the negative electrode includes a negative electrode collector and a negative electrode material mixture layer formed on the negative electrode collector, and, in this case, the negative electrode material mixture layer may be prepared by coating the negative electrode collector with a negative electrode slurry including a negative electrode active material as well as selectively a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, a mixture of a carbon material capable of reversibly intercalating/deintercalating lithium ions and a material, which may be doped and undoped with lithium, may be used as the negative electrode active material.

As the carbon material capable of reversibly intercalating/deintercalating lithium ions, a carbon-based negative electrode active material generally used in a lithium ion secondary battery may be used without particular limitation, and typical examples thereof may be graphite, such as irregular, planar, flaky, spherical, or fibrous natural graphite or artificial graphite, soft carbon (low-temperature sintered carbon) or hard carbon, mesophase pitch carbide, and fired cokes. The negative electrode active material may specifically include graphite.

The material, which may be doped and undoped with lithium, may include Si, $SiO_{x6}$ (0<x6≤2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof. The material, which may be doped and undoped with lithium, may specifically include $SiO_{x6}$ (0<x6≤2), and may more specifically include SiO.

Specifically, the negative electrode active material includes graphite and SiO, and, in this case, a weight ratio of the graphite to the SiO may be in a range of 80:20 to 98:2, particularly 85:15 to 90:10, and more particularly 95:5.

In a case in which $SiO_{x6}$ (0<x6≤2), as a non-carbon-based material, is included as the negative electrode active material, it is disadvantageous in that high-temperature and high-voltage safety is reduced while the SEI on the surface of the negative electrode is collapsed due to volume expansion and contraction of the electrode during charge and discharge. Thus, in the present invention, since the non-aqueous electrolyte solution including the two types of the additives is used, more stable SEI passivation ability may be maintained by increasing the effect of forming an SEI, and thus, a secondary battery may be prepared in which high-temperature and high-voltage safety is secured.

Also, in addition to the mixture of the carbon material capable of reversibly intercalating/deintercalating lithium ions and the material which may be doped and undoped with lithium, at least one selected from the group consisting of lithium metal, metal or an alloy of lithium and the metal, a metal composite oxide, and a transition metal oxide may be used as the negative electrode active material.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_{x3}Fe_2O_3$ (0≤x3≤1), $Li_{x4}WO_2$ (0≤x4≤1), and $Sn_{x5}Me_{1-x}5Me'_{y3}O_{z3}$ (Me: manganese (Mn), Fe, Pb, or Ge; Me': Al, boron (B), phosphorus (P), Si, Groups I, II and III elements of the periodic table, or halogen; 0<x5≤1; 1≤y3≤3; 1≤z3≤8) may be used as the metal composite oxide.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 80 wt %.

(3) Separator

In the lithium secondary battery according to the embodiment of the present invention, the separator blocks an internal short circuit by separating the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of electrolyte ions may be used.

After mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

In this case, the porous separator may generally have a pore diameter of 0.01 μm to 50 μm and a porosity of 5% to 95%. Also, the porous separator may generally have a thickness of 5 μm to 300 μm.

The lithium secondary battery including the non-aqueous electrolyte solution according to the present invention exhibits excellent thermal stability when stored at room temperature and high temperature after being charged at a high voltage of 4.2 V or more. Specifically, the lithium secondary battery has a capacity retention of 84% or more and a resistance increase rate of 14% or less even after stored for 6 weeks or more at 60° C. after being charged at a voltage of 4.2 V or more, and may have a capacity retention of 85% or more even after 150 cycles after being charged at a voltage of 4.2 V or more.

As described above, since the lithium secondary battery of the present invention includes the non-aqueous electrolyte solution containing the two types of the lithium salts, the oligomer represented by Formula 1 as the first additive, and the mixed additive of the three types of the compounds as the second additive, uniformity of the reaction may be ensured by facilitating the movement of lithium ions, and the wetting of the non-aqueous electrolyte solution to the electrode may be improved even if the non-aqueous electrolyte solution containing the two types of the lithium salts is used. In addition, since the performance degradation caused by the decomposition of the solvent at high temperature and the resulting side reaction may be improved by reducing the amount of free solvent due to the coordination bonds between the solvent and $Li^+$ in the battery, a lithium secondary battery having more improved storage characteristics, life characteristics, and capacity characteristics after high-temperature storage may be prepared.

A shape of the lithium secondary battery of the present invention is not particularly limited, but the lithium secondary battery may be used in various forms, such as a cylindrical type, a prismatic type, a pouch type, or a coin type, depending on the purpose. The lithium secondary battery according to the embodiment of the present invention may be a pouch-type secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 2.05 g of a second additive (1 g of lithium difluorophosphate (LiDFP), 1 g of fluorobenzene (FB), 0.05 g of tetravinylsilane (TVS), and weight ratio of LiDFP:FB:TVS was 1:1:0.05), and 0.5 g of 1,3-propane sultone (PS) and 1 g of ethylene sulfate (Esa), as additional additives, to 95.95 g of an organic solvent (ethylene carbonate (EC):dimethyl carbonate (DMC)=volume ratio of 1:9) in which 0.5 M $LiPF_6$ and 1 M LiFSI were dissolved (see Table 1 below).

(Positive Electrode Preparation)

94 wt % of $Li(Ni_{0.8}Co_{0.1}Mn_{0.1})O_2$ (NCM811) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode slurry (solid content of 50 wt %). An about 20 μm thick aluminum (Al) thin film, as a positive electrode collector, was coated with the positive electrode mixture slurry at a loading capacity of 3 $mAh/cm^2$, dried, and roll-pressed to prepare a positive electrode.

(Negative Electrode Preparation)

96 wt % of a negative electrode active material (graphite:SiO=weight ratio of 95:5), 3 wt % of PVDF as a binder, and 1 wt % of carbon black, as a conductive agent, were added to NMP, as a solvent, to prepare a negative electrode slurry (solid content of 80 wt %). A 10 μm thick copper (Cu) thin film, as a negative electrode collector, was coated with the negative electrode mixture slurry, dried, and roll-pressed to prepare a negative electrode.

(Secondary Battery Preparation)

An electrode assembly was prepared by disposing a polyolefin-based separator (polypropylene/polyethylene/polypropylene (PP/PE/PP) three layer structure, thickness: 20 μm) between the above-prepared positive electrode and negative electrode, the electrode assembly was accommodated in a pouch-type battery case, and the non-aqueous electrolyte solution prepared in Example 1 was injected to prepare a 4.2 V-class secondary battery (full cell).

Example 2

(Non-Aqueous Electrolyte Solution Preparation)

A non-aqueous electrolyte solution was prepared in the same manner as in Example 1 except that 2.2 g of a second additive (1 g of LiDFP, 1 g of FB, 0.2 g of TVS, and weight ratio of LiDFP:FB:TVS was 1:1:0.2) was added to 95.8 g of an organic solvent (ethylene carbonate (EC):dimethyl carbonate (DMC)=volume ratio of 1:9) in which 0.5 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 3

(Non-Aqueous Electrolyte Solution Preparation)

A non-aqueous electrolyte solution was prepared in the same manner as in Example 1 except that 7.05 g of a second additive (1 g of LiDFP, 6 g of FB, 0.05 g of TVS, and weight ratio of LiDFP:FB:TVS was 1:6:0.05) was added to 90.95 g of an organic solvent (ethylene carbonate (EC):dimethyl carbonate (DMC)=volume ratio of 1:9) in which 0.5 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 4

(Non-Aqueous Electrolyte Solution Preparation)

A non-aqueous electrolyte solution was prepared in the same manner as in Example 1 except that 7.2 g of a second additive (1 g of LiDFP, 6 g of FB, 0.2 g of TVS, and weight ratio of LiDFP:FB:TVS was 1:6:0.2) was added to 90.8 g of an organic solvent (ethylene carbonate (EC):dimethyl carbonate (DMC)=volume ratio of 1:9) in which 0.5 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 5

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 2.05 g of a second additive (1 g of LiDFP, 1 g of FB, 0.05 g of TVS, and weight ratio of LiDFP:FB:TVS was 1:1:0.05), and 0.5 g of 1,3-propane sultone (PS) and 1 g of ethylene sulfate (Esa), as additional additives, to 95.95 g of an organic solvent (EC:DMC=volume ratio of 1:9) in which 0.5 M $LiPF_6$ and 1.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 6

(Non-Aqueous Electrolyte Solution Preparation)

A non-aqueous electrolyte solution was prepared in the same manner as in Example 5 except that 2.2 g of a second additive (1 g of LiDFP, 1 g of FB, 0.2 g of TVS, and weight ratio of LiDFP:FB:TVS was 1:1:0.2) was added to 95.8 g of an organic solvent (EC:DMC=volume ratio of 1:9) in which 0.5 M $LiPF_6$ and 1.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 7

(Non-Aqueous Electrolyte Solution Preparation)

A non-aqueous electrolyte solution was prepared in the same manner as in Example 5 except that 7.05 g of a second additive (1 g of LiDFP, 6 g of FB, 0.05 g of TVS, and weight ratio of LiDFP:FB:TVS was 1:6:0.05) was added to 90.95 g of an organic solvent (EC:DMC=volume ratio of 1:9) in which 0.5 M $LiPF_6$ and 1.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 8

(Non-Aqueous Electrolyte Solution Preparation)

A non-aqueous electrolyte solution was prepared in the same manner as in Example 5 except that 7.2 g of a second additive (1 g of LiDFP, 6 g of FB, 0.2 g of TVS, and weight ratio of LiDFP:FB:TVS was 1:6:0.2) was added to 90.8 g of an organic solvent (EC:DMC=volume ratio of 1:9) in which 0.5 M $LiPF_6$ and 1.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 9

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 2.05 g of a second additive (1 g of LiDFP, 1 g of FB, 0.05 g of TVS, and weight ratio of LiDFP:FB:TVS was 1:1:0.05), and 0.5 g of 1,3-propane sultone (PS) and 1 g of ethylene sulfate (Esa), as additional additives, to 95.95 g of an organic solvent (EC:DMC=volume ratio of 1:9) in which 1 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 10

(Non-Aqueous Electrolyte Solution Preparation)

A non-aqueous electrolyte solution was prepared in the same manner as in Example 9 except that 2.2 g of a second additive (1 g of LiDFP, 1 g of FB, 0.2 g of TVS, and weight ratio of LiDFP:FB:TVS was 1:1:0.2) was added to 95.8 g of an organic solvent (EC:DMC=volume ratio of 1:9) in which 1 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 11

(Non-Aqueous Electrolyte Solution Preparation)

A non-aqueous electrolyte solution was prepared in the same manner as in Example 9 except that 7.05 g of a second additive (1 g of LiDFP, 6 g of FB, 0.05 g of TVS, and weight ratio of LiDFP:FB:TVS was 1:6:0.05) was added to 90.95 g of an organic solvent (EC:DMC=volume ratio of 1:9) in which 1 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 12

(Non-Aqueous Electrolyte Solution Preparation)

A non-aqueous electrolyte solution was prepared in the same manner as in Example 9 except that 7.2 g of a second additive (1 g of LiDFP, 6 g of FB, 0.2 g of TVS, and weight ratio of LiDFP:FB:TVS was 1:6:0.2) was added to 90.8 g of an organic solvent (EC:DMC=volume ratio of 1:9) in which 1 M $LiPF_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 13

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 2.05 g of a second additive (1 g of LiDFP, 1 g of FB, 0.05 g of TVS, and weight ratio of LiDFP:FB:TVS was 1:1:0.05), and 0.5 g of 1,3-propane sultone (PS) and 1 g of ethylene sulfate (Esa), as additional additives, to 95.95 g of an organic solvent (EC:DMC=volume ratio of 1:9) in which 1.0 M LiPF$_6$ and 0.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 14

(Non-Aqueous Electrolyte Solution Preparation)

A non-aqueous electrolyte solution was prepared in the same manner as in Example 13 except that 2.2 g of a second additive (1 g of LiDFP, 1 g of FB, 0.2 g of TVS, and weight ratio of LiDFP:FB:TVS was 1:1:0.2) was added to 95.8 g of an organic solvent (EC:DMC=volume ratio of 1:9) in which 1.0 M LiPF$_6$ and 0.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 15

(Non-Aqueous Electrolyte Solution Preparation)

A non-aqueous electrolyte solution was prepared in the same manner as in Example 13 except that 7.05 g of a second additive (1 g of LiDFP, 6 g of FB, 0.05 g of TVS, and weight ratio of LiDFP:FB:TVS was 1:6:0.05) was added to 90.95 g of an organic solvent (EC:DMC=volume ratio of 1:9) in which 1.0 M LiPF$_6$ and 0.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 16

(Non-Aqueous Electrolyte Solution Preparation)

A non-aqueous electrolyte solution was prepared in the same manner as in Example 1 except that 7.2 g of a second additive (1 g of LiDFP, 6 g of FB, 0.5 g of TVS, and weight ratio of LiDFP:FB:TVS was 1:6:0.5) was added to 90.8 g of an organic solvent (EC:DMC=volume ratio of 1:9) in which 1.0 M LiPF$_6$ and 0.5 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 17

(Non-Aqueous Electrolyte Solution Preparation)

A non-aqueous electrolyte solution was prepared in the same manner as in Example 1 except that 7.05 g of a second additive (1 g of LiDFP, 6 g of FB, 0.05 g of TVS, and weight ratio of LiDFP:FB:TVS was 1:6:0.05) was added to 90.95 g of an organic solvent (EC:DMC=volume ratio of 1:9) in which 1.05 M LiPF$_6$ and 0.45 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 18

(Non-Aqueous Electrolyte Solution Preparation)

A non-aqueous electrolyte solution was prepared in the same manner as in Example 1 except that 5.7 g of the compound represented by Formula 1a (weight-average molecular weight (Mw): 5,000, p1=5, and q1=3), as a first additive, was added to 90.75 g of an organic solvent (ethylene carbonate (EC):dimethyl carbonate (DMC)=volume ratio of 1:9) in which 0.5 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Example 19

(Non-Aqueous Electrolyte Solution Preparation)

A non-aqueous electrolyte solution was prepared by adding 0.3 g of the compound represented by Formula 1a (weight-average molecular weight (Mw): 5,000, p1=5, and q1=3), as a first additive, 7.2 g of a second additive (1 g of LiDFP, 6 g of FB, 0.2 g of TVS, and weight ratio of LiDFP:FB:TVS was 1:6:0.2), 0.5 g of 1,3-propane sultone (PS), and 1 g of ethylene sulfate (Esa) to 91 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 1

(Non-Aqueous Electrolyte Solution Preparation)

A non-aqueous electrolyte solution was prepared by adding 3 g of vinylene carbonate, 0.5 g of 1,3-propane sultone (PS), and 1 g of ethylene sulfate (Esa), as additional additives, to 95.5 g of an organic solvent (EC:EMC=volume ratio of 3:7) in which 0.3 M LiPF$_6$ and 0.7 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 2

(Non-Aqueous Electrolyte Solution Preparation)

A non-aqueous electrolyte solution was prepared by adding 3 g of vinylene carbonate, 0.5 g of 1,3-propane sultone (PS), and 1 g of ethylene sulfate (Esa), as additional additives, to 95.5 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 3

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 7 g of a second additive (1 g of LiDFP, 6 g of FB, and weight ratio of LiDFP:FB:TVS was 1:6:0), 0.5 g of 1,3-propane sultone (PS), and 1 g of ethylene sulfate (Esa) to 91 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 4

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 1.2 g of a second additive (1 g of LiDFP, 0.2 g of TVS, and weight ratio of LiDFP:FB:TVS was 1:0:0.2), 0.5 g of 1,3-propane sultone (PS), and 1 g of ethylene sulfate (Esa) to 96.8 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 5

(Non-Aqueous Electrolyte Solution Preparation)

A non-aqueous electrolyte solution was prepared by adding 0.5 g of the compound represented by Formula 1a (weight-average molecular weight (Mw): 5,000, p1=5, and q1=3), as a first additive, 6.2 g of a second additive (6 g of FB, 0.2 g of TVS, and weight ratio of LiDFP:FB:TVS was 0:6:0.2), 0.5 g of 1,3-propane sultone (PS), and 1 g of ethylene sulfate (Esa) to 91.8 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 6

(Non-Aqueous Electrolyte Solution Preparation)

A non-aqueous electrolyte solution without including a first additive was prepared by adding 7.2 g of a second additive (1 g of LiDFP, 6 g of FB, 0.2 g of TVS, and weight ratio of LiDFP:FB:TVS was 1:6:0.2), 0.5 g of 1,3-propane sultone (PS), and 1 g of ethylene sulfate (Esa) to 91.3 g of an organic solvent (EC:DMC=volume ratio of 1:9) in which 1 M LiPF$_6$ and 1 M LiFSI were dissolved (see Table 1 below).

(Secondary Battery Preparation)

A 4.2 V-class secondary battery was prepared in the same manner as in Example 1 except that the above-prepared non-aqueous electrolyte solution was used instead of using the non-aqueous electrolyte solution of Example 1.

Comparative Example 7

(Positive Electrode Preparation)

94 wt % of Li(Ni$_{0.6}$Co$_{0.2}$Mn$_{0.2}$)O$_2$ (NCM622) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode slurry (solid content of 50 wt %). An about 20 μm thick aluminum (Al) thin film, as a positive electrode collector, was coated with the positive electrode mixture slurry at a loading capacity of 3 mAh/cm$^2$, dried, and roll-pressed to prepare a positive electrode.

(Negative Electrode Preparation)

96 wt % of a negative electrode active material (graphite: SiO=weight ratio of 95:5), 3 wt % of PVDF as a binder, and 1 wt % of carbon black, as a conductive agent, were added to NMP, as a solvent, to prepare a negative electrode slurry (solid content of 80 wt %). A 10 μm thick copper (Cu) thin film, as a negative electrode collector, was coated with the negative electrode mixture slurry, dried, and roll-pressed to prepare a negative electrode.

(Secondary Battery Preparation)

An electrode assembly was prepared by disposing a polyolefin-based separator (polypropylene/polyethylene/polypropylene (PP/PE/PP) three layer structure, thickness: 20 μm) between the above-prepared positive electrode and negative electrode, the electrode assembly was accommodated in a pouch-type battery case, and the non-aqueous electrolyte solution prepared in Example 12 was injected to prepare a 4.2 V-class secondary battery (full cell) (see Table 1 below).

TABLE 1

| | Lithium salt | | Organic solvent | | First additive | Second additive | | Additional additive | | Negative electrode |
| | Molar ratio of first lithium salt:second lithium salt | Total concentration (M) of lithium salt | Composition | Addition amount (g) | Addition amount of oligomer of Formula 1a (g) | Weight ratio of LiDFP:FB:TVS | Total amount (g) | Total amount (g) | Positive electrode | Weight ratio of graphite:SiO |
|---|---|---|---|---|---|---|---|---|---|---|
| Example 1 | 1:2 | 1.5 | EC/DMC = 1:9 | 95.95 | 0.5 | 1:1:0.05 | 2.05 | 1.5 | NCM811 | 95:5 |
| Example 2 | 1:2 | 1.5 | EC/DMC = 1:9 | 95.8 | 0.5 | 1:1:0.2 | 2.2 | 1.5 | NCM811 | 95:5 |
| Example 3 | 1:2 | 1.5 | EC/DMC = 1:9 | 90.95 | 0.5 | 1:6:0.05 | 7.05 | 1.5 | NCM811 | 95:5 |
| Example 4 | 1:2 | 1.5 | EC/DMC = 1:9 | 90.8 | 0.5 | 1:6:0.2 | 7.2 | 1.5 | NCM811 | 95:5 |
| Example 5 | 1:3 | 2 | EC/DMC = 1:9 | 95.95 | 0.5 | 1:1:0.05 | 2.05 | 1.5 | NCM811 | 95:5 |
| Example 6 | 1:3 | 2 | EC/DMC = 1:9 | 95.8 | 0.5 | 1:1:0.2 | 2.2 | 1.5 | NCM811 | 95:5 |
| Example 7 | 1:3 | 2 | EC/DMC = 1:9 | 90.95 | 0.5 | 1:6:0.05 | 7.05 | 1.5 | NCM811 | 95:5 |
| Example 8 | 1:3 | 2 | EC/DMC = 1:9 | 90.8 | 0.5 | 1:6:0.2 | 7.2 | 1.5 | NCM811 | 95:5 |
| Example 9 | 1:1 | 2 | EC/DMC = 1:9 | 95.95 | 0.5 | 1:1:0.05 | 2.05 | 1.5 | NCM811 | 95:5 |
| Example 10 | 1:1 | 2 | EC/DMC = 1:9 | 95.8 | 0.5 | 1:1:0.2 | 2.2 | 1.5 | NCM811 | 95:5 |
| Example 11 | 1:1 | 2 | EC/DMC = 1:9 | 90.95 | 0.5 | 1:6:0.05 | 7.05 | 1.5 | NCM811 | 95:5 |
| Example 12 | 1:1 | 2 | EC/DMC = 1:9 | 90.8 | 0.5 | 1:6:0.2 | 7.2 | 1.5 | NCM811 | 95:5 |
| Example 13 | 1:0.5 | 1.5 | EC/DMC = 1:9 | 95.95 | 0.5 | 1:1:0.05 | 2.05 | 1.5 | NCM811 | 95:5 |
| Example 14 | 1:0.5 | 1.5 | EC/DMC = 1:9 | 95.8 | 0.5 | 1:1:0.2 | 2.2 | 1.5 | NCM811 | 95:5 |
| Example 15 | 1:0.5 | 1.5 | EC/DMC = 1:9 | 90.95 | 0.5 | 1:6:0.05 | 7.05 | 1.5 | NCM811 | 95:5 |
| Example 16 | 1:0.5 | 1.5 | EC/DMC = 1:9 | 90.8 | 0.5 | 1:6:0.5 | 7.2 | 1.5 | NCM811 | 95:5 |
| Example 17 | 1:0.43 | 1.5 | EC/DMC = 1:9 | 90.95 | 0.5 | 1:6:0.05 | 7.05 | 1.5 | NCM811 | 95:5 |
| Example 18 | 1:2 | 1.5 | EC/DMC = 1:9 | 90.75 | 3.7 | 1:1:0.05 | 2.05 | 1.5 | NCM811 | 95:5 |
| Example 19 | 1:1 | 2 | EC/DMC = 1:9 | 91 | 0.3 | 1:6:0.2 | 7.2 | 1.5 | NCM811 | 95:5 |
| Comparative Example 1 | 1:2.3 | 1 | EC/DMC = 3:7 | 95.5 | — | — | — | 4.5 | NCM811 | 95:5 |
| Comparative Example 2 | 1:1 | 2 | EC/DMC = 1:9 | 95.5 | — | — | — | 4.5 | NCM811 | 95:5 |
| Comparative Example 3 | 1:1 | 2 | EC/DMC = 1:9 | 91 | 0.5 | 1:6:0 | 7 | 1.5 | NCM811 | 95:5 |
| Comparative Example 4 | 1:1 | 2 | EC/DMC = 1:9 | 96.8 | 0.5 | 1:0:0.2 | 1.2 | 1.5 | NCM811 | 95:5 |
| Comparative Example 5 | 1:1 | 2 | EC/DMC = 1:9 | 91.8 | 0.5 | 0:6:0.2 | 6.2 | 1.5 | NCM811 | 95:5 |
| Comparative Example 6 | 1:1 | 2 | EC/DMC = 1:9 | 91.3 | — | 1:6:0.2 | 7.2 | 1.5 | NCM811 | 95:5 |
| Comparative Example 7 | 1:1 | 2 | EC/DMC = 1:9 | 90.8 | 0.5 | 1:6:0.2 | 7.2 | 1.5 | NCM622 | 100:0 |

EXPERIMENTAL EXAMPLES

Experimental Example 1. Direct Current Internal Resistance Evaluation (1) at Low Temperature (−10° C.)

After each of the secondary batteries prepared in Examples 1 to 4 and the secondary batteries prepared in Examples 13 to 17, which included the non-aqueous electrolyte solution having a total concentration of the lithium salt of 1.5 M, was subjected to a formation process at a rate of 0.1 C for 3 hours at 25° C., each secondary battery was charged at a rate of 0.33 C to 4.25 V under a constant current-constant voltage (CC-CV) condition at 25° C. and discharged at a rate of 0.33 C to 2.5 V under a constant current (CC) condition. The above charging and discharging were set as one cycle, and 3 cycles of initial charging and discharging were performed.

Subsequently, at a state of charge (SOC) of 50%, direct current internal resistance (DCIR) at low temperature of each secondary battery was measured by using a voltage difference generated by discharging the battery at a rate of 2.5 C for 30 seconds at a low temperature (−10° C.). The results thereof are presented in Table 2 below.

TABLE 2

| | DCIR at low temperature (−10° C.) (mohm) |
|---|---|
| Example 1 | 178.3 |
| Example 2 | 213.1 |
| Example 3 | 183.5 |
| Example 4 | 234.3 |
| Example 13 | 287.2 |
| Example 14 | 299.4 |
| Example 15 | 291.2 |
| Example 16 | 303.5 |
| Example 17 | 425.1 |

Referring to Table 2, it may be understood that direct current internal resistances (DCIRs) at low temperature of the lithium secondary batteries prepared in Examples 1 to 4 and Examples 13 to 16 were improved to about 303.5 mohm or less. It may be predicted that this was due to the stabilization of the ionic conductivity of lithium ions in the battery, the improvement of electrolyte solution wetting at the same time, and the effect of forming a stable film on the surface of the electrode, because the non-aqueous electrolyte solution contained the first additive and the second additive as well as the two types of the lithium salts.

In contrast, since the lithium secondary battery prepared in Example 17 had a relatively lower molar ratio of the second lithium salt to the first lithium salt, ionic conductivity of the electrolyte was reduced and resistance at a negative electrode interface was increased, and thus, it may be understood that direct current internal resistance (DCIR) was slightly increased to about 312 ohm.

Experimental Example 2. Direct Current Internal Resistance Evaluation (2) at Low Temperature (−10° C.)

Each of the secondary batteries prepared in Examples 5 to 10, which included the non-aqueous electrolyte solution having a total concentration of the lithium salt of 2 M, the secondary battery prepared in Comparative Example 1, which included the non-aqueous electrolyte solution having a total concentration of the lithium salt of 1 M, and the secondary batteries prepared in Comparative Examples 2 to 6, which included the non-aqueous electrolyte solution having a total concentration of the lithium salt of 2 M, was charged at a rate of 0.33 C to 4.25 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed.

Subsequently, at a state of charge (SOC) of 50%, direct current internal resistance (DCIR) at low temperature of each secondary battery was measured by using a voltage difference generated by discharging the battery at a rate of 2.5 C for 30 seconds at a low temperature (−10° C.). The results thereof are presented in Table 3 below.

TABLE 3

| | DCIR at low temperature (−10° C.) (mohm) |
|---|---|
| Example 5 | 303.7 |
| Example 6 | 332.2 |
| Example 7 | 311.5 |
| Example 8 | 339.4 |
| Example 9 | 324.7 |
| Example 10 | 335.1 |
| Comparative Example 1 | 416.5 |
| Comparative Example 2 | 553.3 |
| Comparative Example 3 | 340.8 |
| Comparative Example 4 | 342.9 |
| Comparative Example 5 | 439.0 |
| Comparative Example 6 | 537.1 |

Referring to Table 3, direct current internal resistances (DCIRs) at low temperature of the lithium secondary batteries prepared in Comparative Examples 1 to 6 were about 340.8 mohm or more, but it may be understood that direct current internal resistances (DCIRs) at low temperature of the lithium secondary batteries prepared in Examples 5 to 10 were improved to about 339.4 mohm or less. It may be predicted that this was due to the stabilization of the ionic conductivity of lithium ions in the battery, the improvement of the electrolyte solution wetting at the same time, and the effect of forming a stable film on the surface of the electrode, because the non-aqueous electrolyte solution contained the first additive and the second additive as well as the two types of the lithium salts.

Experimental Example 3. Evaluation of Capacity Retention after High-Temperature Storage After each of the secondary batteries prepared in Examples 1 to 16, 18, and 19 and Comparative Examples 1 to 6 was subjected to a formation process at a rate of 0.1 C for 3 hours at 25° C., each secondary battery was charged at a rate of 0.33 C to 4.25 V under a CC-CV condition at 25° C. and discharged at a rate of 0.33 C to 2.5 V under a CC condition. The above charging and discharging were set as one cycle, and 3 cycles of initial charging and discharging were performed.

Subsequently, after the secondary battery was charged at a rate of 0.33 C to 4.25 V under a CC-CV condition, stored at 60° C. for 6 weeks (SOC(state of charge) 100%), and then discharged at a rate of 0.33 C to 2.5 V under a CC condition, capacity retention was measured.

Capacity retention after high-temperature (60° C.) storage was evaluated by using the following Equation 1, and the results thereof are presented in Table 4 below.

Capacity retention after high-temperature storage= (discharge capacity after 6 weeks/discharge capacity before high-temperature storage)×100    [Equation 1]

Experimental Example 4. Evaluation of Resistance Increase Rate after High-Temperature Storage After each of the secondary batteries prepared in Examples 1 to 16, 18, and 19 and Comparative Examples 1 to 6 was subjected to a formation process at a rate of 0.1 C for 3 hours at 25° C., each secondary battery was charged at a rate of 0.33 C to 4.25 V under a CC-CV condition at 25° C. and discharged at a rate of 0.33 C to 2.5 V under a CC condition. The above charging and discharging were set as one cycle, and 3 cycles of initial charging and discharging were performed. An initial voltage was measured using PNE-0506 charge/discharge equipment (manufacturer: PNE SOLUTION Co., Ltd., 5 V, 6 A), and a resistance value was calculated therefrom.

Subsequently, after the initially charged and discharged lithium secondary battery was charged at a rate of 0.33 C to 4.25 V under a CC-CV condition and stored at 60° C. for 6 weeks (SOC(state of charge) 100%), a voltage after high-temperature storage was measured while being again discharged at 2.5 C for 10 seconds at a SOC of 50%. The voltage was measured using the PNE-0506 charge/discharge equipment (manufacturer: PNE SOLUTION Co., Ltd., 5 V, 6 A). A resistance value was calculated from the voltage after high-temperature storage.

The initial resistance value and resistance value after high-temperature storage measured as described above were substituted into the following Equation (2) to measure a resistance increase rate, and the results thereof are presented in Table 4 below.

Resistance increase rate after high-temperature storage (%)=[(resistance value after 6 weeks of high-temperature storage/resistance value before high-temperature storage)×100]−100    [Equation 2]

TABLE 4

| | High-temperature storage characteristics (60° C./6 weeks) | |
|---|---|---|
| | Capacity retention (%) | Resistance increase rate (%) |
| Example 1 | 89.6 | 8.5 |
| Example 2 | 93.6 | 7.3 |
| Example 3 | 85.3 | 10.7 |
| Example 4 | 86.9 | 9.7 |
| Example 5 | 85.6 | 14.8 |
| Example 6 | 86.9 | 12.9 |
| Example 7 | 84.2 | 16.4 |
| Example 8 | 85.5 | 14.2 |
| Example 9 | 81.6 | 15.8 |
| Example 10 | 83.1 | 12.3 |
| Example 11 | 81.7 | 15.8 |
| Example 12 | 82.7 | 13.3 |
| Example 13 | 87.4 | 10.5 |
| Example 14 | 89.5 | 9.4 |
| Example 15 | 83.2 | 12.9 |
| Example 16 | 85.3 | 12.1 |
| Example 18 | 80.6 | 17.4 |
| Example 19 | 80.7 | 18.5 |
| Comparative Example 1 | 72.4 | 19.8 |
| Comparative Example 2 | 75.7 | 23.7 |
| Comparative Example 3 | 78.7 | 26.2 |
| Comparative Example 4 | 76.8 | 20.5 |
| Comparative Example 5 | 75.8 | 24.2 |
| Comparative Example 6 | 74.7 | 23.3 |

Referring to Table 4, the lithium secondary batteries prepared in Examples 1 to 16 had a capacity retention (%) of 81.6% or more and a resistance increase rate (%) of 16.4% or less after storage at 60° C. for 6 weeks, but it may be understood that the lithium secondary batteries prepared in Comparative Examples 1 to 6 had a capacity retention (%) of 78.7% or less after storage at 60° C. for 6 weeks and a resistance increase rate (%) was deteriorated to 19.8% or more.

With respect to the lithium secondary battery of Example 18 which included the non-aqueous electrolyte solution in which the excessive amount of the first additive was added, since the wettability was decreased due to the increase in the viscosity of the electrolyte solution, it may be understood that capacity retention (%) after storage at 60° C. for 6 weeks was 80.6% which was slightly lower than those of the lithium secondary batteries prepared in Examples 1 to 16 and a resistance increase rate (%) was 17.4% which was slightly higher than those of the lithium secondary batteries prepared in Examples 1 to 16.

Also, with respect to the lithium secondary battery of Example 19 which included the non-aqueous electrolyte solution in which the excessive amount of the second additive was added in comparison to the first additive, since a thickness of the film formed on the surface of the electrode was increased, it may be understood that capacity retention (%) after storage at 60° C. for 6 weeks was 80.7% which was slightly lower than those of the lithium secondary batteries prepared in Examples 1 to 16 and a resistance increase rate (%) was 18.5% which was slightly higher than those of the lithium secondary batteries prepared in Examples 1 to 16.

Experimental Example 5. High-Temperature Cycle Characteristics Evaluation

After each of the secondary batteries prepared in Examples 4, 8, 12, and 16 and Comparative Example 6 was subjected to a formation process at a rate of 0.1 C for 3 hours at 25° C., each secondary battery was charged at a rate of 0.33 C to 4.25 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed.

Subsequently, each of the initially charged and discharged lithium secondary batteries was charged at a rate of 0.33 C to 4.25 V under a CC-CV condition at a high temperature (45° C.) and discharged at a rate of 0.1 C to 2.5 V under a CC condition. The above charging and discharging were set as one cycle, and 150 cycles were performed.

Capacity after the first cycle and capacity after a $150^{th}$ cycle were substituted into the following Equation 3 to calculate capacity retention. The results thereof are presented in Table 5 below.

Capacity retention(%)=(discharge capacity after the $150^{th}$ cycle/discharge capacity after the $1^{st}$ cycle)×100    [Equation 3]

TABLE 5

| | Capacity retention after 150 cycles (%) |
|---|---|
| Example 4 | 91 |
| Example 8 | 91 |
| Example 12 | 89 |
| Example 16 | 90 |
| Comparative Example 6 | 63 |

Referring to Table 5, the secondary batteries prepared in Examples 4, 8, 12, and 16, which included the non-aqueous electrolyte solution containing both the first additive and the second additive, had a capacity retention (%) after 150 cycles at a high temperature (45° C.) of about 89% or more, wherein it may be understood that the capacity retentions after 150 cycles at a high temperature (45° C.) were significantly improved in comparison to that (63%) of the secondary battery prepared in Comparative Example 6 which included the non-aqueous electrolyte solution only containing the second additive without containing the first additive.

Experimental Example 6. High-Temperature Storage Characteristics Evaluation

Direct current internal resistance at a low temperature (−10° C.) was evaluated in the same manner as in Experimental Example 1 for each of the secondary batteries prepared in Example 12 and Comparative Example 7, and the results thereof are presented in Table 6 below.

Also, capacity retention after high-temperature storage, resistance increase rate after high-temperature storage, and high-temperature cycle characteristics were evaluated in the same manner as in Experimental Examples 3 to 5 for the secondary battery prepared in Comparative Example 7, and the results thereof are presented in Table 6 below.

In this case, evaluation results of the capacity retention after high-temperature storage, resistance increase rate after high-temperature storage, and high-temperature cycle characteristics of the secondary battery of Example 12, which were measured in Experimental Examples 3 to 5, are listed together in Table 6 below.

TABLE 6

| | DCIR at low temperature (−10° C.) (mohm) | High-temperature storage characteristics (60° C./6 weeks) | | Capacity retention after 150 cycles (%) |
| --- | --- | --- | --- | --- |
| | | Capacity retention (%) | Resistance increase rate (%) | |
| Example 12 | 342.1 | 82.7 | 13.3 | 89 |
| Comparative Example 7 | 402.8 | 78.5 | 29.5 | 84 |

Referring to Table 6, with respect to the secondary battery of Example 12 in which Li(Ni$_{0.8}$Co$_{0.1}$Mn$_{0.1}$)O$_2$ was used as a positive electrode active material and the mixture of graphite and SiO was used as a negative electrode active material together with the non-aqueous electrolyte solution prepared in the present invention, it may be confirmed that the results of the direct current internal resistance (DCIR) at low temperature, capacity retention after high-temperature storage, and high-temperature cycle life characteristics were all improved in comparison to those of the secondary battery of Comparative Example 7 in which Li(Ni$_{0.6}$Co$_{0.2}$Mn$_{0.2}$)O$_2$ was used as a positive electrode active material and graphite was only used as a negative electrode active material together with the non-aqueous electrolyte solution prepared in the present invention.

The above descriptions are merely exemplary embodiments for preparing the secondary battery according to the present invention, so that the present invention is not limited thereto. The true scope of the present invention should be defined to the extent that those skilled in the art can make various modifications and changes thereto without departing from the scope of the invention, as defined by the appended claims.

The invention claimed is:

1. A non-aqueous electrolyte solution for a lithium secondary battery, the non-aqueous electrolyte solution comprising:
   an organic solvent,
   a first lithium salt that is LiPF$_6$,
   a second lithium salt excluding LiPF$_6$,
   a first additive that is an oligomer represented by Formula 1, and
   a second additive that is a mixed additive of lithium difluorophosphate (LiDFP), fluorobenzene (FB), and tetravinylsilane (TVS), wherein the second additive comprises the lithium difluorophosphate (LiDFP), the fluorobenzene (FB), and the tetravinylsilane (TVS) in a weight ratio of 1:1:0.05 to 1:6:0.5:

[Formula 1]

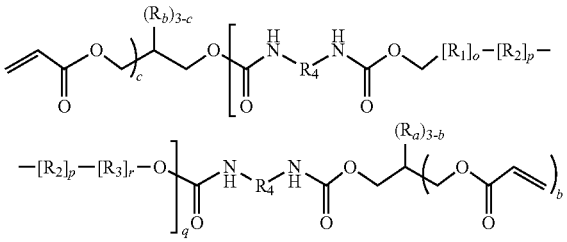

wherein, in Formula 1,
R$_1$ is —R$_1$'—O—, wherein R$_1$' is an alkylene group having 1 to 5 carbon atoms which is unsubstituted or substituted with fluorine,
R$_2$ is —R$_2$'—O—, wherein R$_2$' is an alkylene group having 1 to 3 carbon atoms which is unsubstituted or substituted with fluorine,
R$_3$ is an alkylene group having 1 to 5 carbon atoms which is unsubstituted or substituted with fluorine,
R$_4$ is an aliphatic hydrocarbon group or an aromatic hydrocarbon group,
R$_a$ and R$_b$ are each independently hydrogen or an alkyl group having 1 to 3 carbon atoms,
o, p, q, and r are numbers of repeating units,
is an integer of 1 to 5,
p is an integer of 1 to 10,
r is an integer of 1 to 5,
q is an integer of 3 to 15, and
b and c are each independently an integer of 1 to 3.

2. The non-aqueous electrolyte solution for a lithium secondary battery of claim 1, wherein a molar ratio of the first lithium salt to the second lithium salt is in a range of 1:0.5 to 1:3.3.

3. The non-aqueous electrolyte solution for a lithium secondary battery of claim 1, wherein the organic solvent is a mixed solvent including a cyclic carbonate-based organic solvent and a linear carbonate-based organic solvent.

4. The non-aqueous electrolyte solution for a lithium secondary battery of claim 3, wherein the linear carbonate-based organic solvent is dimethyl carbonate.

5. The non-aqueous electrolyte solution for a lithium secondary battery of claim 1, wherein the oligomer represented by Formula 1 comprises a compound represented by Formula 1a:

[Formula 1a]

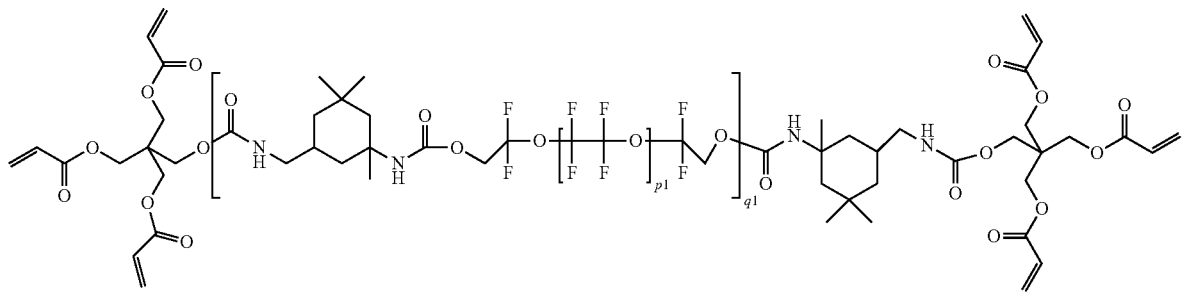

wherein, in Formula 1a, p1 and q1 are numbers of repeating units, p1 is an integer of 1 to 10, and q1 is an integer of 3 to 5.

6. The non-aqueous electrolyte solution for a lithium secondary battery of claim 1, wherein the first additive is included in an amount of 0.1 wt % to 5.5 wt % based on a total weight of the non-aqueous electrolyte solution.

7. A lithium secondary battery comprising the non-aqueous electrolyte solution of claim 1.

8. The lithium secondary battery of claim 7, wherein the lithium secondary battery, comprises:

a positive electrode including a lithium transition metal oxide represented by Formula 5 as a positive electrode active material;

a negative electrode including graphite and SiO as negative electrode active materials; and a separator:

$$Li_x(Ni_aCo_bMn_c)O_2 \qquad \text{[Formula 5]}$$

wherein, in Formula 5, $0.9 \leq x \leq 1.2, 0.65 < a \leq 0.9, 0.05 \leq b < 0.35,$ and $0.05 \leq c < 0.35.$

* * * * *